April 23, 1940.　　　　C. H. RIPPL　　　　2,198,514
FLUID PRESSURE OPERATED APPARATUS
Filed Oct. 6, 1937　　　4 Sheets-Sheet 1

Inventor
Charles H. Rippl
Harry P. Canfield
Attorney

April 23, 1940.   C. H. RIPPL   2,198,514
FLUID PRESSURE OPERATED APPARATUS
Filed Oct. 6, 1937   4 Sheets-Sheet 2
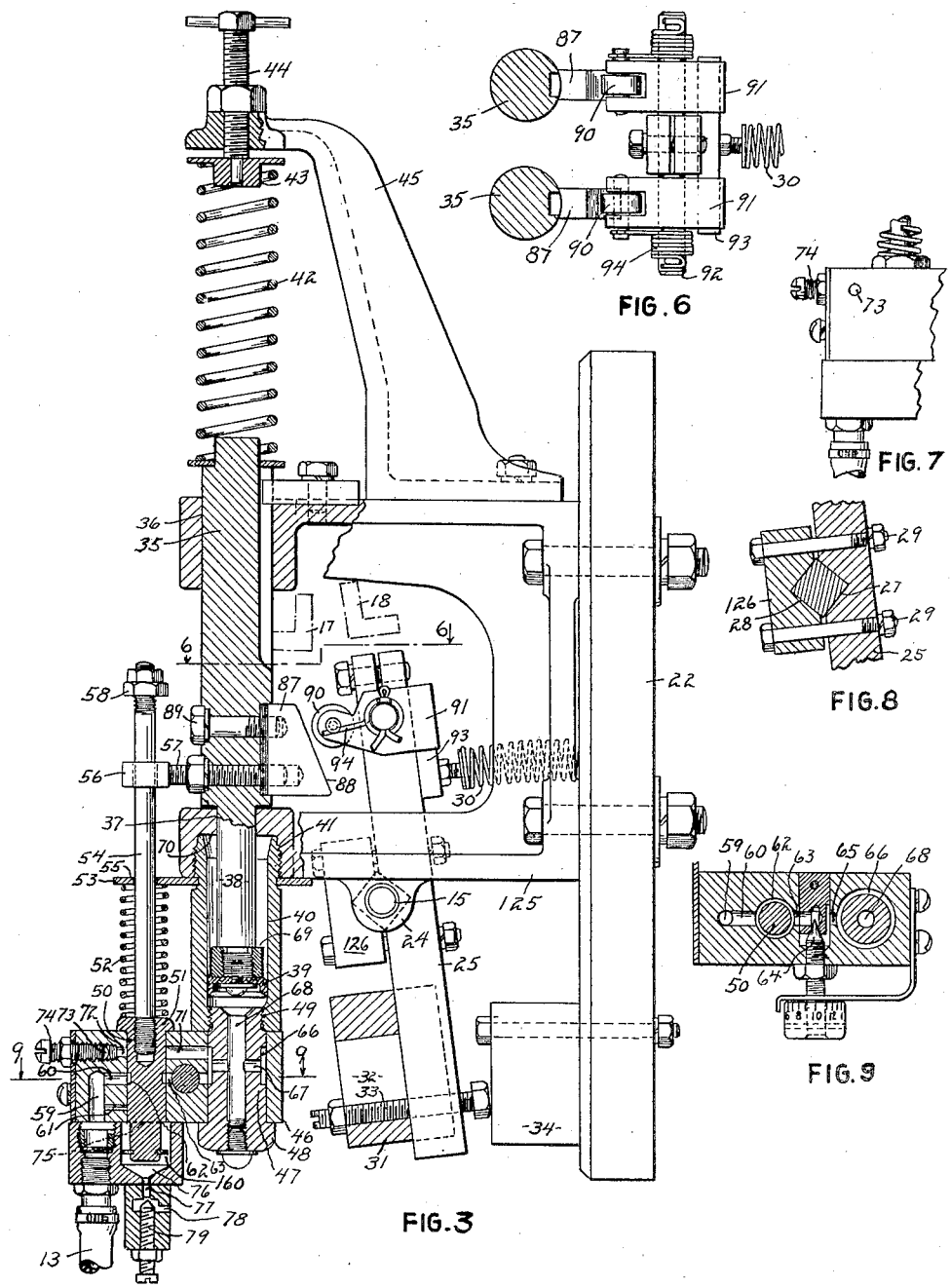
Inventor
Charles H. Rippl
Harry P. Canfield
Attorney

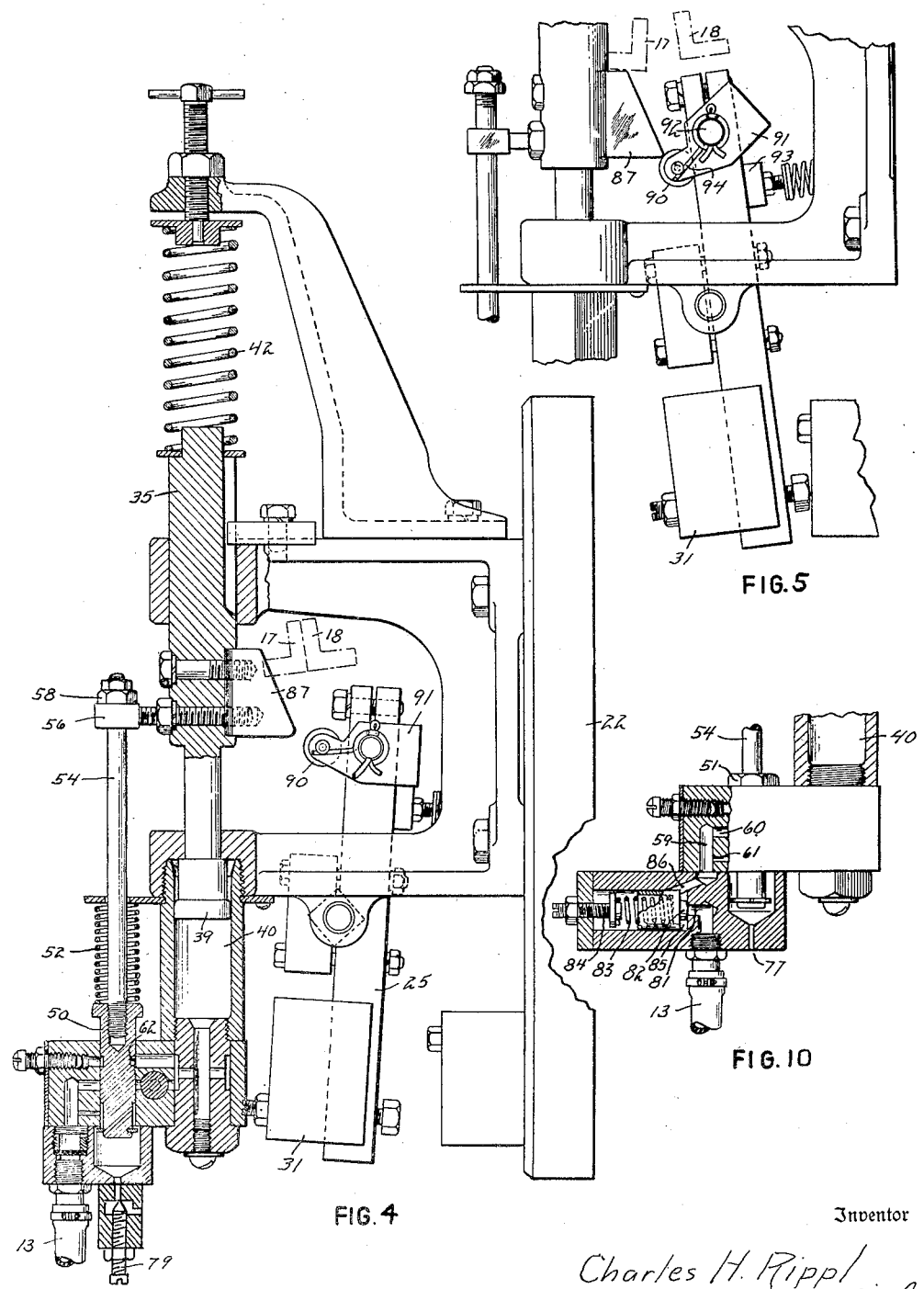

Patented Apr. 23, 1940

2,198,514

UNITED STATES PATENT OFFICE 2,198,514

FLUID PRESSURE OPERATED APPARATUS

Charles H. Rippl, Cleveland, Ohio, assignor to The Clark Controller Company, Cleveland, Ohio, a corporation of Ohio Application October 6, 1937, Serial No. 167,636

13 Claims. (Cl. 121—38)

This invention relates to fluid pressure operated apparatus of the type in which a mechanism element is moved by fluid pressure through a cycle of controlled movements to operate and control another mechanism, for example, an electric switch.

While my invention may be applied to various uses, I have illustrated and described it herein (as illustrative of such uses) as applied to the operation and control of an electric switch to control and time the initiation and duration and interruption, or initiation, duration, interruption, and frequency of electric welding current impulses.

It is among the objects of the invention:

To provide a fluid pressure operated apparatus by which a movable apparatus operating element may be moved and its movement controlled in an improved manner;

To provide, in a fluid pressure operated apparatus, improved means to reciprocate a movable element and to time its rate of movement in one or both directions;

To provide, in a fluid pressure operated apparatus, improved means to operate a movable element and to control the frequency at which one operation may follow another;

To provide an apparatus operated by fluid pressure from a fluid pressure source, and having improved means to prevent successive operations until after interruption of the communication of the fluid pressure to the apparatus from the source;

To provide an apparatus operated by fluid pressure and having improved valve means to control the communication of fluid pressure to the apparatus and the interruption thereof;

To provide a fluid pressure operated apparatus comprising a pressure movable element and having improved means to adjustably control the rate of its movement;

To provide in a fluid pressure operated apparatus comprising a pressure movable element, improved means to effect a rapid initial movement of the element and a subsequent delayed movement thereof;

To provide a fluid pressure operated apparatus having a pressure movable element and provided with improved means to prevent movement thereof except at predetermined fluid prsssure;

To provide generally a fluid pressure operated apparatus having a pressure movable element arranged to operate a mechanism in an improved manner;

Other objects will be apparent to those skilled in the art to which my invention appertains.

My invention is fully disclosed in the following description taken in connection with the accompanying drawings, in which:

Fig. 3 is a view to an enlarged scale taken approximately from plane 3—3 of Fig. 1, with parts thereof in elevation;

Fig. 4 is a view similar to Fig. 3 but with parts thereof in different operative positions;

Fig. 5 is a view showing a part of Fig. 3 with parts thereof in other different operative positions;

Fig. 6 is a fragmentary cross-sectional view taken from the plane 6—6 of Fig. 3;

Fig. 7 is an elevational view of some of the parts of Fig. 3, which in that figure are shown in section;

Fig. 8 is a fragmentary sectional view showing in section parts which are shown in elevation in Fig. 3;

Fig. 9 is a cross-sectional view taken from the plane 9—9 of Fig. 3;

Fig. 10 is a view similar to a part of Fig. 3 but illustrating a modification;

Figures 1, 2:
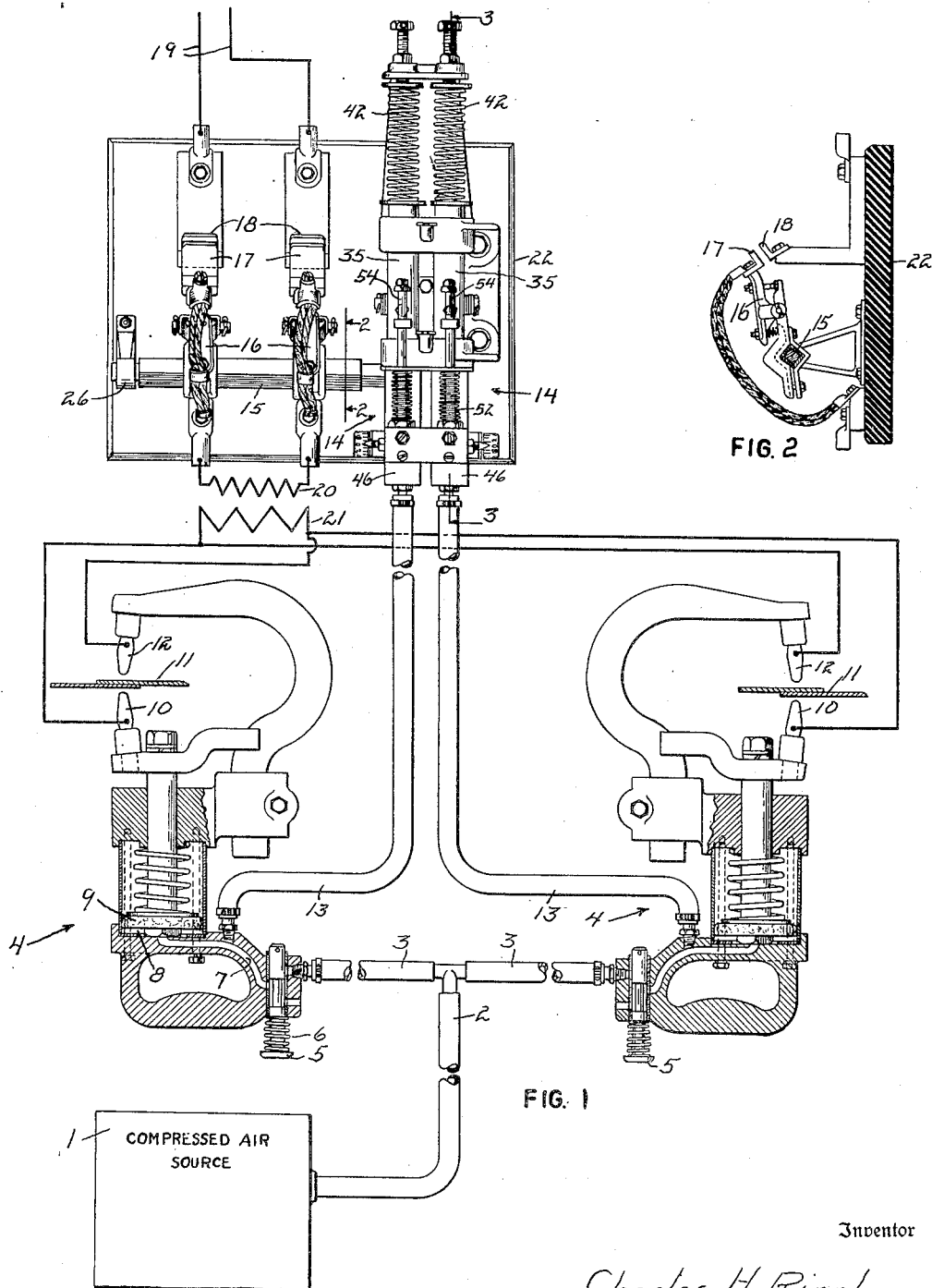
Fig. 1 is a view illustrating an embodiment of my invention in connection with a source of fluid pressure, a welding apparatus, and an electric switch operated by the embodiment of my invention to control electric current impulses supplied to the welding apparatus.
Fig. 2 is a cross-sectional view taken from the plane 2—2 of Fig. 1.

Referring to the drawing Fig. 1, I have shown at 1 a source of fluid pressure, which may be compressed air, with which communicates a conduit 2 connected to branch conduits 3—3, each of which supplies the fluid pressure to a welding device shown generally at 4, under the control of an operator's valve 5. When the valve 5 is depressed by the operator against a spring 6, fluid pressure is admitted from the conduit 3, by a duct 7, to the cylinder 8 of the welding device, and operates a piston 9 to move an electrode 10 to clamp work 11 between the electrode 10 and a stationary electrode 12 mounted upon the device.

The pressure in the duct 7 is also communicated to a conduit 13, the pressure in this conduit being at first less than the source pressure due to the movement of the piston 9, and the pressure rising when the electrodes engage with the work, to a value approximately that of the source, to operate a fluid pressure operable apparatus shown generally at 14.

The operation of the apparatus 14 rocks a shaft 15, and a pair of switch arms 16—16 secured thereon. The arms carry movable contacts 17—17, which are thereby rocked into engagement with stationary contacts 18—18. When the contacts are thus engaged they close an electric circuit from supply wires 19—19 to the primary 20 of a transformer, the secondary 21 of which is connected to the electrodes 12—10 of each of the welding devices 4—4 and, if at the time the electrodes of the device are engaged with the work, welding current will flow therethrough to effect a weld in the work 11.

By the apparatus indicated generally at 14, the shaft 15 is, after a time interval, released so that it rocks back in the other direction disengaging the contacts 17 and 18 and breaking the welding current.

The construction of the welding devices 4—4 and of the switches including the shaft 5, arms 16—16 and contacts 17 and 18 is well known and constitutes no essential part of the present invention, the present invention relating more particularly to the apparatus indicated at 14.

For a more complete description of the welding device 4 and of the electric switch controlling the current thereto, reference may be had to my co-pending application, Serial Number 62,795, filed February 7, 1936, for Improvements in welding current control apparatus, and subject matter illustrated and described herein in connection therewith but not claimed herein is claimed in said co-pending application, to which attention is hereby directed.

The apparatus indicated generally at 14 will now be described in connection with Figs. 2 to 13 inclusive.

Referring more particularly to Figs. 3 to 9 inclusive, I have shown at 22 a panel or base upon which the apparatus, as well as the shaft 15 and the switches operated thereby, may be mounted. The said shaft 15 is mounted at one end in a bearing 26 (see Fig. 1) and the other end is mounted in a bearing 24 on a bracket 125 secured to the panel 22, and rigidly clamped to the shaft is the switch operating arm 25. The arm may be rigidly secured to the shaft by the arrangement shown in Figs. 3 and 8 comprising a clamping element 126 and notches 27 and 28 in the arm 25 and the clamping element, in which the shaft 15, on a square or polygonal portion thereof is clamped by bolts 29—29.

The shaft 15 is therefore rocked in one direction, the direction to engage the contacts 17 with the contacts 18 by oscillatory movement of the arm 25 in one direction, the clockwise direction as viewed in Fig. 3, which movement is given to the arm by the apparatus to be more fully described, and is rocked in the other direction by counter-clockwise oscillation of the arm 25 effected by a spring 30, abutting at opposite ends upon the arm 25 and upon the panel 22.

The arm 25 has secured thereto an inertia weight 31, which may be adjusted longitudinally along the arm by a slot 32 in the weight and a screw 33 clamping it to the arm in any adjusted position along the slot; and the arm is stopped in its normal position by engagement of the inner end of the screw 33 with a block 34 on the panel 22.

The purposes of the inertia weight 31 are more fully set forth in the above referred to co-pending application.

A plunger 35 is vertically reciprocable in axially aligned bearing bores in the bracket 125, an upper bore 36 guiding the upper larger portion of the plunger and a lower bore 37 guiding a reduced diameter portion, which below the bore constitutes a piston rod 38 having on the lower end thereof a piston 39. The piston is reciprocable in a cylinder 40, mounted on the bracket by screwing the upper end thereof into a threaded bore 41 in the bracket.

The plunger is normally retained downwardly by a spring 42 abutting at its lower end upon the upper end of the plunger 35 and at its upper end abutting upon a head 43, mounted on the lower end of an adjusting screw 44, by which the tension of the spring may be adjusted, the screw 44 being threaded into the upper end of an arm 45 secured to the bracket 125.

A valve housing 46 is mounted upon the lower end of the cylinder 40 by a barrel 47 which has a head 48 on its lower end and extends upwardly through a bore in the valve housing 46 and above the valve housing as at 49 is threaded into the cylinder 40 below the piston 39, thereby sealedly clamping the valve housing 46 upon the lower end of the cylinder 40.

A valve 50 is reciprocably mounted in a bore in the valve housing 46, preferably disposed with its axis parallel with the axis of the piston rod 38 on the plunger 35, and has a head 51, normally resting upon the upper side of the valve housing 46, being held down by a spring 52, which abuts at its lower end upon the head 51 and at its upper end upon a bracket 53, the bracket 53 being secured to the bracket 125 preferably by clamping it between a shoulder on the cylinder 40 and the underside of the bracket 125.

A valve rod 54 is screw-threaded at its lower end into the upper end of the valve 50, passes upwardly through a perforation 55 in the bracket 53 to guide it, and above the bracket passes through an eye 56 which is rigidly secured to the plunger 35, preferably by being formed in the end of a screw 57 which is threaded into the plunger.

On the upper end of the valve rod 54 is a stop 58 which may be adjusted along the valve rod by being preferably formed from a pair of locked nuts.

Upon admission of fluid pressure to the cylinder 40 under the piston 39 from the conduit 13 the plunger 35 will be moved upwardly thereby, and at a point in its upward stroke, the eye 56 will engage the stop 58 and move the valve longitudinally to cause it to exhaust the fluid pressure from the cylinder, whereupon the spring 42 will return the plunger 35 downwardly to its normal position. As it returns, its movement is cushioned by a restriction to the air exhaust. The valve 50 is held in its upward position, in a manner to be described, against the pressure of the spring 52, notwithstanding that the eye 56 upon the downward return of the plunger has been removed from the stop 58 thus maintaining the exhaust until the pressure in the conduit 13 is relieved whereupon the valve will return downwardly; and the valve may be retarded in its downward movement whereby a time interval is introduced between successive admissions of air to the cylinder 40 and operations of the plunger 35. The rate of upward movement of the plunger 35 may be adjustably controlled by adjustment of the rate at which the fluid pressure is admitted to the cylinder 40. These features of operation and the means for performing them involving other elements, fluid pressure ducts, etc., in the housing 46, will now be described.

The fluid pressure in the conduit 13 is communicated to a duct 59 in the valve housing 46 and to a pair of branch ducts 60 and 61. The inner end of the branch duct 61 is, when the valve 50 is in its normal downward position, cut off by the body of the valve 50, but the duct 60 communicates with an annular groove 62 in the body of the valve and the fluid pressure may therefore flow around the annular groove to a duct 63, whence it flows past a needle valve 64 (see Fig. 9) to a duct opening into an annular groove 66 in the above referred-to barrel 47, the annular groove 66 communicating by one or more ducts 67 with a duct 68 extending longitudinally through the barrel 47 and opening at its upper end into the cylinder 40.

It is this communication of pressure from the conduit 13 to the cylinder 40 which, as described above, moves the plunger 35 upwardly.

The rate of the upward movement of the plunger may be controlled by the needle valve 64, which variably restricts the flow of fluid under pressure from the duct 63 to the duct 65 and to the annular groove 66 as plainly shown in Fig. 9.

The upward stroke of the plunger 35 is limited or stopped by the engagement of the upper end 69 of the piston 39 with a shoulder 70 on the bracket 125, and at or near the end of the stroke the eye 56 engages the stop 58 and moves the valve 50 upwardly opening an exhaust to the cylinder 40 by way of the duct 68, and by one or more ducts 67, the annular groove 66, a duct 71 communicating with the annular groove 62 in the valve which is now in alignment with the duct 71, and around the groove 62 to a duct 72, and thence out to atmosphere through a port 73 (see Figs. 3 and 7), the size of the port 73 being adjustable by a screw 74.

The upward movement of the valve 50 not only effects a controlled exhaust for the cylinder 40, but also, by the upward movement of the annular groove 62, cuts off the supply of fluid pressure from the conduit 13 to the cylinder.

The plunger 35 and piston 39 may now return as described, the downward movement being delayed or cushioned by the restricted port 73, but the valve 50 is now held in its upper position by the following means. When the valve 50 is raised, a shoulder 75 on the valve moves upwardly beyond the inner end of the duct 61, whereupon the fluid pressure is thereby communicated through the duct 61, to a chamber 76, surrounding the lower end of the valve.

The valve is thus subjected at its lower end to the fluid pressure and is held up thereby. In a lower part of the chamber it is provided with a pressure escape duct 77 which discharges the pressure through a port 78 under the control of a needle valve 79. The pressure is supplied from the conduit 13 to the chamber 76, but constantly leaks out therefrom through the port 78, at a reduced rate, which maintains sufficient pressure in the chamber 76 to hold the valve up so long as the pressure in the conduit 13 is applied.

When, however, pressure in the conduit 13 is cut off by the operator upon releasing the valve button 5 (see Fig. 1) and allowing the spring 6 to move the valve in the well known manner, cutting off the fluid pressure from the conduit 3, the pressure in the cylinder 76 gradually reduces by being exhausted from the port 78 until the spring 52 above the valve is sufficient to overcome this pressure and move the valve downwardly, forcing the fluid out of the chamber. The valve moves downwardly with a retarded movement effected by the restriction to the flow of fluid from the chamber 76 which in turn is effected by the adjustment of the needle valve 79.

Thus the valve cannot reset and a successive movement of the plunger 35 cannot be performed until the pressure is removed from the conduit 13, and until after the elapse of a time interval determined by the needle valve 79.

The upward stroke of the valve 50 may be limited by a ring 100 on the lower end of the valve, engaging a suitable shoulder at the upper end of the chamber 76.

The parts above described are shown in their normal position in Fig. 3, and in Fig. 4 are shown in the position which they occupy when the piston 39 has moved to the top of its stroke and has moved the valve 50 to its upper position.

In some cases it will be desirable to insure that the plunger 35 will not move sluggishly but always with a predetermined velocity and to insure this, means may be provided as shown in a modification of Fig. 10 to withhold the application of the fluid pressure to the cylinder 40 until the pressure has attained a suitable predetermined value. According to this modification the fluid pressure in the conduit 13 is communicated to a duct 81, the end of which is closed by a valve 82 seated against the end of the duct by a spring 83, the tension of which may be adjusted by a screw 84. The valve 82 reciprocates in a bore 85 with which communicates a duct 86 supplying pressure to the aforesaid duct 59.

When pressure in the conduit 13 has attained a suitable predetermined value, this pressure, communicated through the duct 81 to the valve 82, moves it against the tension of the spring 83 and the fluid pressure thereupon is communicated through the ducts 86, 59 and 60 to the cylinder 40 as above described.

In this modification also, the duct 77 opens directly into the atmosphere and is of restricted size not being controlled by a needle valve such as the valve 79 and therefore this form illustrates that such needle valve control is not in all cases necessary.

When the movement of the plunger is used to operate a switch as described, this arrangement will insure positive, uniform, completed movements of the plunger and when the switch times an electric current will insure that the current impulses will never be of greater than a predetermined maximum duration because the plunger will always start to move at the same minimum fluid pressure and will remain inert until such pressure is attained, and will not move at less than a predetermined minimum velocity.

Reciprocatory motion of the plunger 35 above described may be utilized to oscillate the arm 25 for the switch operating purpose above described, as follows. A cam 87 having an inclined cam face 88 is rigidly secured to the plunger 35, for example by bolts 89—89. When the plunger 35 moves upwardly and carries the cam 87 with it, the cam face 88 engages a roller 90 on the arm 25 and cammingly moves the roller on the arm to operate the arm. In the upward stroke of the plunger 35 the cam 87 moves the arm 25 to engage the contacts 17 and 18 and then passes on beyond the roller 90. If the motion of the plunger 35 is rapid enough and the inertia of the weight 31 is correspondingly predetermined, the arm may be given a kick which will cause the contacts 17 and 18 to be held closed by the inertia as indicated in Fig. 4.

If the plunger 35 and cam 87 are returned quickly enough, the cam will be restored to its position under the roller 90 before the roller 90 has returned, but if the force of the spring 30 and inertia of the weight 31 are so pre-arranged as to effect the return of arm 25 in a very short time interval, they may be returned before the cam 87 returns, and in such cases the roller may be made so as to be rocked out of the path of the cam by the downward movement of the cam. Such movement is indicated in Fig. 5, the structure being shown in that figure in connection with Fig. 6. The roller 90 is mounted upon a supplemental arm 91 pivoted upon a stud 92, the arm 91 normally being constrained to engage a stop 93 by a spring 94 carried by the stud 92. When the cam 87 engaging the roller 90 rocks it out of the path of the cam, the spring 94 will again, with a snap movement, rock the arm 91 to position the roller 90 for the next operation.

This illustrated use of the fluid pressure operated apparatus of my invention, namely to momentarily close a switch by means of the cam constituting part of my invention, is more completely described in the above mentioned co-pending application to which reference may be had.

Figure 12:
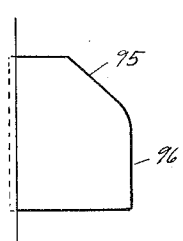
Figs. 12 and 13 are views illustrating modified forms of a cam element constituting a part of Fig. 3.
Figure 13:
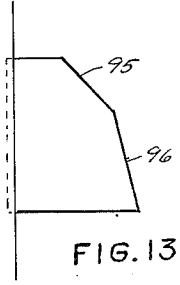

When the apparatus of my invention is used as described to operate a welding current timing switch, the length of the current impulse may be adjustably varied by the needle valve 64 which adjusts the rate of movement of the plunger 35 and the rate of movement of the cam face 88 engaging the roller 90. Cams having the cam faces 88 of other shapes than the simple inclined plane of Figs. 3, 4 and 5 may be provided as shown in Figs. 12 and 13. Such cams have faces provided with relatively flat portions 95 by which the switch contacts may be quickly engaged, and relatively steep portions 96—96 upon which the roller 90 may roll after the contacts have been engaged, holding them engaged. With such cams, the roller 90 preferably rolls off the lower end of the cam face during the upward stroke of the plunger.

Figure 11:
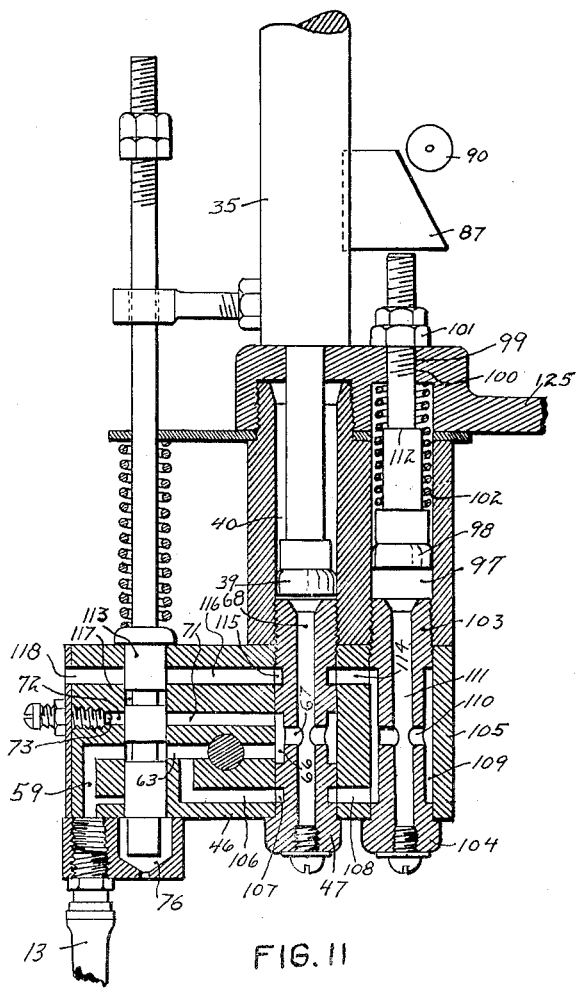
Fig. 11 is a view similar to a part of Fig. 3 but showing another modification.

In some of the uses of my invention, for example in its illustrative use of operating a welding current switch, and particularly when relatively long time intervals and current impulses are desired, and the movement of the plunger 35 is greatly retarded to give such long times, it is desirable to eliminate the waste of time required by the slowly moving plunger to first engage the contacts, and this waste time may be eliminated by the modification shown in Fig. 11. In this form a second cylinder 97 is provided having a piston 98 therein connected to a piston rod 99 passing upwardly through a bore 100 in the bracket 125, and at its upper end terminating directly under the cam 87. A stop 101 preferably in the form of locked nuts determines the downward position of the piston 98, and a spring 102 holds the piston down and tends to return it downwardly.

A barrel 103 threaded into the lower end of the cylinder 97 has a head 104 on the lower end thereof, and the valve housing 46 has an extension 105 thereon clamped between the lower end of the cylinder 97 and the head 104. The above described duct 63 has a branch duct 106 leading therefrom through an annular groove 107 in the above described barrel 47 communicating pressure in the conduit 13 to the groove 107.

A duct 108 connects the groove 107 with an annular groove 109 on the barrel 103 and one or more ducts 110 connect the groove 109 with a central bore 111 in the barrel 103 which communicates with the cylinder 97 below the piston 98.

In the operation of this form, when pressure is admitted to the conduit 13, it flows as above described for the first form to the duct 63 and thence without restriction is communicated by the system including the duct 106, groove 107, duct 108, groove 109, ducts 110 and 111 to the cylinder 97 and immediately moves the piston 98 upwardly, causing the upper end of the piston rod 99 to engage the underside of the cam and move it upward causing it to engage and move the roller 90 sufficiently to engage the switch contacts in the manner described for the first form.

The upward stroke of the piston 98 is limited by the engagement of a shoulder 112 on the piston rod with a shoulder on the underside of the bracket 125, the extent of movement being such as to just suitably engage the switch contacts, and engagement of the contacts is effected immediately, without delay.

Air is admitted to the cylinder 40 at the same time as to the cylinder 97. The upward movement of the cam 87 by the piston rod 99 of course raises the plunger 35 and the piston 39 and thereafter the movement of the cam 87 is taken over by the plunger 35 which moves upwardly at a retarded rate as described.

At or near the end of the stroke of the plunger 35, the valve, in this case 113, is raised. The cylinder 40 then exhausts by way of the ducts 68 and 67, groove 66, ducts 71 and 72 and port 73 as before. The cylinder 97 also exhausts by way of ducts 111 and 110, groove 109, a duct 114, an annular groove 115, a duct 116, an annular groove 117 in the valve 113 and an outlet duct 118.

Again the valve 113 may be held up by pressure in the valve chamber 76 until pressure in the conduit 13 is reduced, and by retarding the escape of pressure from the chamber 76 the return of the valve 113 may be delayed.

In Fig. 1 I have illustrated a pair of welding guns 4—4 having each an operator's valve 5; and have shown two apparatuses 14—14 and in the foregoing have described the operation of one apparatus 14.

The two apparatuses may be identical and each plunger 35 may have a cam 87 and each cam may, upon movement of the plunger, operate the arm 25. If desired the cam faces of the cams may be different and the adjustment of the needle valves 74, 64 and 79 as well as the tension of the spring 30 and inertia of the weight 31 may be different so that the cycle of operations as well as the duration of the current impulse for one gun may differ from that for the other to adapt them to different kinds of welding work.

Subject matter illustrated and described herein but not claimed is being claimed either in my above mentioned co-pending application, Serial Number 62,795, or in my co-pending application Serial Number 123,357, filed February 1, 1937, for Improvements in time controls for pneumatically operated switches, now Patent No. 2,180,171 dated November 14, 1939.

My invention is not limited to the exact details illustrated and described. Changes and modifications may be made within the spirit of my invention without sacrificing its advantages and within the scope of the appended claims.

I claim:

1. In a fluid pressure actuated device for operating an apparatus comprising a movable apparatus element, a fluid pressure chamber, an element movable by fluid pressure in the chamber for moving the apparatus element, a source of fluid pressure, conduit means communicating with the source and with the chamber, operable valve means controlling the conduit means to admit fluid to the chamber, an outlet from the chamber, a control valve operable by pressure-effected movement of the pressure movable element to open the outlet, and means to maintain the control valve in operated condition so long as the operable valve means is maintained operated.

2. In a fluid pressure actuated device for operating an apparatus comprising a movable apparatus element, a fluid pressure chamber, an element movable by fluid pressure in the chamber for moving the apparatus element, a source of fluid pressure, conduit means communicating with the source and with the chamber, operable valve means controlling the conduit means to admit fluid to the chamber, an outlet from the chamber, a control valve operable by a pressure-effected movement of the pressure movable element to open the outlet, means for applying fluid pressure from the source under control of the operable valve means to hold the control valve in operated condition until the operable valve means is restored, and means to then restore the control valve.

3. In a fluid pressure actuated device for operating an apparatus comprising a movable apparatus element, a fluid pressure chamber, an element movable by fluid pressure in the chamber for moving the apparatus element, a source of fluid pressure, conduit means communicating with the source and with the chamber, operable valve means controlling the conduit means to admit fluid to the chamber, a control valve biased to take up a normal flow position, a connection between the pressure movable element and the control valve to move it to an operated position to cut off fluid pressure to the chamber and to open an exhaust outlet from the chamber, and fluid pressure operated means to hold the control valve in operated position under control of the operable valve means.

4. In a fluid pressure actuated device for operating an apparatus comprising a movable apparatus element, a fluid pressure chamber, an element movable by fluid pressure in the chamber for moving the apparatus element, a source of fluid pressure, conduit means communicating with the source and with the chamber, operable valve means controlling the conduit means to admit fluid to the chamber, a control valve, controlling the flow of pressure to and from the chamber, biased to take up a normal flow position, a connection between the pressure movable element and the control valve to move it to an operated position to cut off fluid pressure to the chamber and to open an exhaust outlet from the chamber, a valve chamber, conduit means controlled by the control valve for communicating pressure to the valve chamber from the source upon operation of the control valve, and the control valve being held by the pressure in cut-off position under control of the operable valve means.

5. In a fluid pressure actuated device for operating an apparatus comprising a movable apparatus element, a fluid pressure chamber, an element movable by fluid pressure in the chamber for moving the apparatus element, a source of fluid pressure, and conduit means communicating with the source and with the chamber, operable valve means controlling the conduit means to admit fluid pressure to the chamber, a control valve in the line of the conduit means having a normal position for admitting pressure to the chamber, a connection between the pressure movable element and the control valve to move it to operated position, an outlet conduit means from the pressure chamber normally closed by the control valve and opened upon movement thereof to operated position, a valve chamber communicating with the control valve, conduit means for communicating fluid pressure to the valve chamber upon movement of the valve to operated position, a restricted constantly open escape port from the valve chamber to effect holding of the control valve in operated position by pressure so long as the operable valve means is maintained operated and to permit the pressure to be relieved through the escape port to effect restoring of the control valve when the operable valve means is restored.

6. In a fluid pressure actuated device for operating an apparatus comprising a movable apparatus element, a fluid pressure chamber, an element movable by fluid pressure in the chamber for moving the apparatus element, a source of fluid pressure, conduit means communicating with the source and with the chamber, operable valve means controlling the conduit means to admit fluid to the chamber, an adjustable valve to adjustably vary the rate of fluid admission to the chamber to adjustably vary the velocity of movement of the fluid pressure movable element, a control valve controlling flow in the conduit means, an opening from the chamber, means rendering the control valve operable by a pressure-effected movement of the pressure movable element to open the outlet, and means to maintain the control valve in operated condition so long as the operable valve means is retained operated.

7. In a fluid pressure actuated device for operating an apparatus comprising a movable apparatus element, a fluid pressure chamber, an element movable by fluid pressure in the chamber for moving the apparatus element and biased to return to a normal position, a source of fluid pressure, conduit means communicating with the source and with the chamber, operable valve means controlling the conduit means to admit fluid to the chamber, an exhaust valve, means rendering the exhaust valve operable by a pressure-effected movement of the pressure movable element to exhaust fluid pressure from the chamber to permit the pressure movable element to return to normal position independently of the operable valve means, an adjustable valve to adjust the rate of exhaust to retard the return of the pressure movable element, and means to maintain the exhaust valve in operated condition so long as the operable valve means is retained operated.

8. In a fluid pressure actuated device for operating an apparatus comprising a movable apparatus element movable away from and back to a normal position, a fluid pressure chamber, an element movable by fluid pressure in the chamber for moving the apparatus element from its normal position, means causing the apparatus element to return to its normal position after a predetermined amount of movement of the movable element, a second fluid pressure chamber, a second fluid pressure movable element movable by fluid pressure in the second chamber arranged to initiate substantially unretarded movement of the first pressure movable element, a source of fluid pressure, conduit means communicating with the source and with both chambers, valve means controlling the conduit means to admit fluid pressure to the chambers, means to adjustably restrict the rate of fluid admission to the first chamber to adjustably vary the velocity of the said predetermined movement of its associated fluid pressure movable element after said substantially unretarded initial movement thereof, to adjustably vary the time during which the apparatus element is away from its normal position.

9. In a fluid pressure actuated apparatus, a fluid pressure chamber and a pressure movable element movable by fluid pressure in the chamber at different velocities commensurable with different fluid pressures in the chamber, an apparatus element movable from a normal position by movement of the pressure movable element, means causing the apparatus element to return to its normal position after a predetermined amount of movement of the pressure movable element, a source of rising fluid pressure, valve means and conduit means controlled thereby to effect communication of source fluid pressure to the chamber, automatic valve means responsive to said rising fluid pressure to control admission to the chamber to prevent admission except at pressures above a predetermined minimum to cause movement of the apparatus element to occur at velocities above a predetermined minimum to control the time during which the apparatus element is away from its normal position.

10. The apparatus described in claim 9 and in which the automatic valve means comprises a piston valve, covering a port of smaller diameter than the valve, and a quick port opening movement of the valve is effected by exposure of the full area of the piston valve to pressure as soon as the valve starts to move in the port opening direction.

11. In a combination, a fluid pressure actuated machine comprising a machine operating fluid pressure chamber, a source of fluid pressure, operable valve means and conduit means controlled thereby to admit fluid pressure from the source to the machine chamber, the chamber being arranged to cause the pressure therein to rise and approach the source pressure, an apparatus comprising a movable apparatus element controlling an operation of the machine, a device comprising a fluid pressure chamber and a pressure movable element movable by fluid pressure in the chamber at different velocities commensurable with different fluid pressures in the chamber, the apparatus element having a normal position, means by which the movable element moves the apparatus element from its normal position and permits it to return thereto after a predetermined time commensurable with the velocity of pressure effected movement of the movable element, conduit means to effect communication of the rising fluid pressure of the machine chamber to the fluid pressure chamber, automatic valve means responding to said rising fluid pressure to control admission to the fluid pressure chamber to prevent admission except at pressures above a predetermined minimum to insure movement of the apparatus element at velocities above a predetermined minimum.

12. In a fluid pressure actuated device for operating an apparatus comprising a movable apparatus element, a fluid pressure chamber, an element movable by fluid pressure in the chamber for moving the apparatus element, a source of fluid pressure, conduit means communicating with the source and with the chamber, operable valve means controlling the conduit means to admit fluid to the chamber, a control valve operable by pressure-effected-movement of the movable element to move it to an operated position to cut off fluid pressure to the chamber and to open an exhaust outlet from the chamber and means to maintain the control valve in operated position as long as the operable valve means is maintained in operated condition.

13. In a power operated apparatus, a movable apparatus element movable away from and back to a normal position, a first power movable element for moving the apparatus element from its normal position, means for causing the apparatus element to return to its normal position after a predetermined amount of movement of the first power movable element, a second power movable element movable to initiate substantially unretarded movement of the first power movable element, a source of power for moving both power movable elements, means to adjustably control the velocity of movement of the first power movable element after said substantially unretarded initial movement thereof to adjustably vary the time during which the apparatus element is away from its normal position.

CHARLES H. RIPPL.